(No Model.)  4 Sheets—Sheet 1.

B. L. HOOD.
FILTER.

No. 331,790. Patented Dec. 8, 1885.

Witnesses.
Albert C. Goodwin
Charles Selkirk

Benjamin L. Hood
Inventor.
by his Atty
Alex. Selkirk (No Model.)  4 Sheets—Sheet 2.

B. L. HOOD.
FILTER.

No. 331,790.  Patented Dec. 8, 1885.

Witnesses:
Albert B. Goodwin
Charles Selkirk

Benjamin L. Hood
Inventor.
By his Attorney
Alex. Selkirk (No Model.)  
4 Sheets—Sheet 3.

B. L. HOOD.
FILTER.

No. 331,790. Patented Dec. 8, 1885.

Witnesses:
Albert C. Goodwin
Charles Seekins

Benjamin L. Hood
Inventor.
by his Atty
Alex. Selkirk

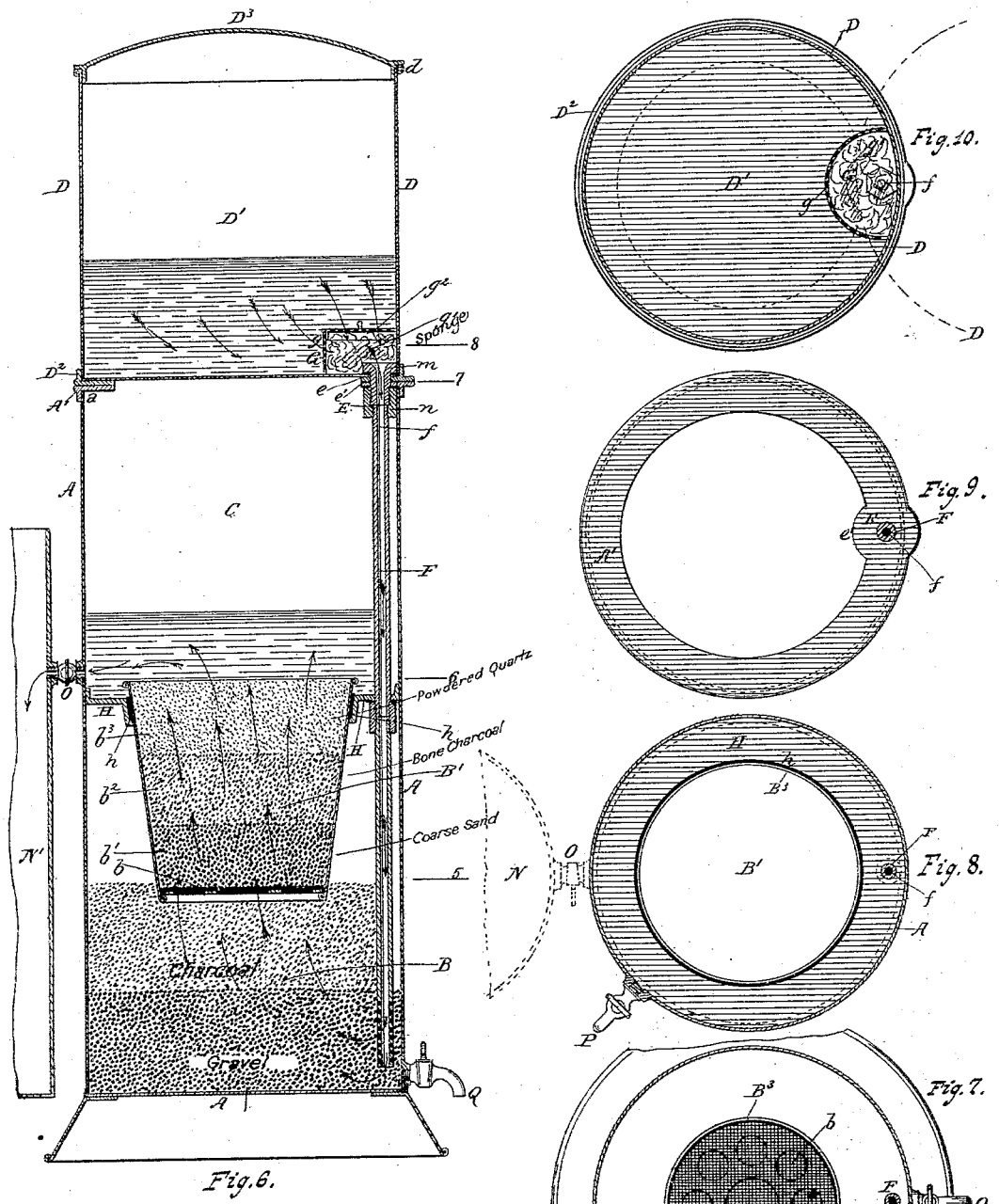

UNITED STATES PATENT OFFICE.

BENJAMIN L. HOOD, OF ALBANY, NEW YORK, ASSIGNOR, BY DIRECT AND MESNE ASSIGNMENTS, TO LOUIS DANIELS, OF SAME PLACE.

FILTER.

SPECIFICATION forming part of Letters Patent No. 331,790, dated December 8, 1885.

Application filed July 17, 1885. Serial No. 171,880. (No model.)

*To all whom it may concern:*

Be it known that I, BENJAMIN L. HOOD, a citizen of the United States, residing at Albany, in the county of Albany and State of New York, have invented certain new and useful Improvements in Water-Filters, of which the following is a specification.

My invention relates to certain improvements in water-filters in which the pressure of a body of impure water and its downward passage through a pipe or tube will force the water through a duplex filtering medium, upwardly and into a pure-water chamber above this duplex filtering medium, and thence have passage to a water-cooler; and it consists in the combination and arrangements of parts and devices as hereinafter particular described, and specifically set forth in the claims.

The objects of my invention are to provide means by which ordinary water for culinary or drinking purposes will be cleansed and purified from all foreign substances by its passage in an upwardly direction, under pressure of the weight of the water to be purified, through a duplex filtering medium, and thence into a receiving-chamber, which has communication with a water-cooler; and, second, to provide specific combinations of devices by means of which my invention will be carried into effect. I attain these objects by the means illustrated in the accompanying drawings, forming a part of this specification, in which—

Figure 1:
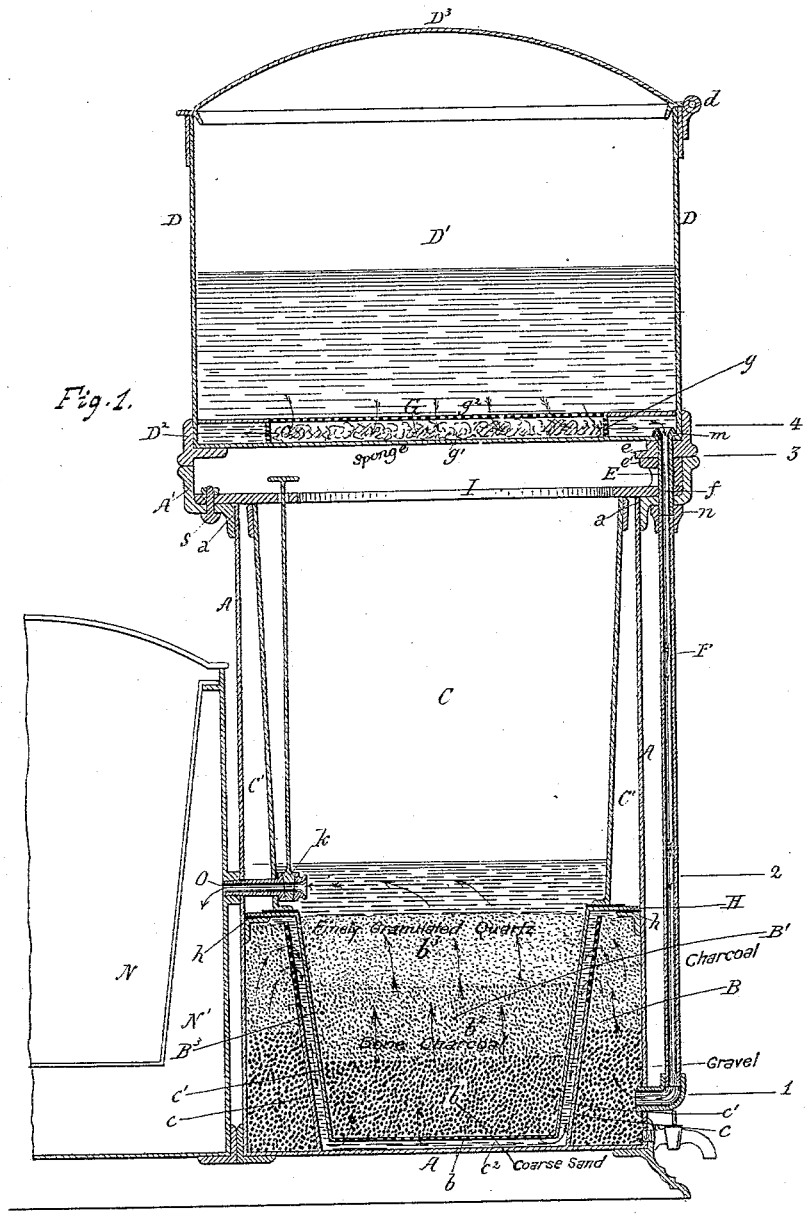
Figure 3:
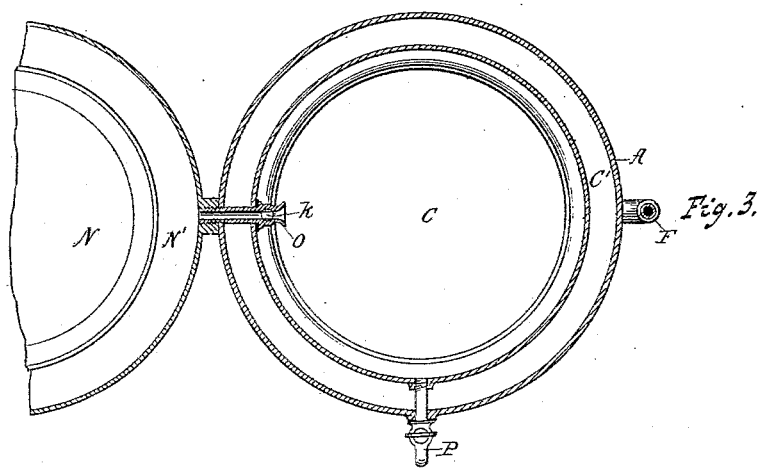
Figure 2:
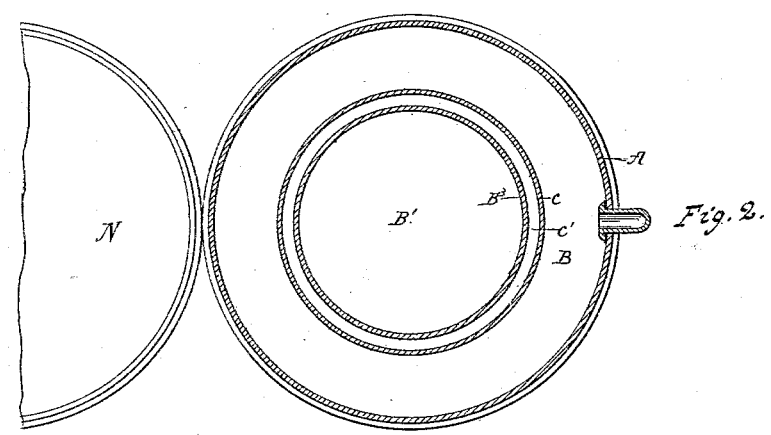
Figure 5:
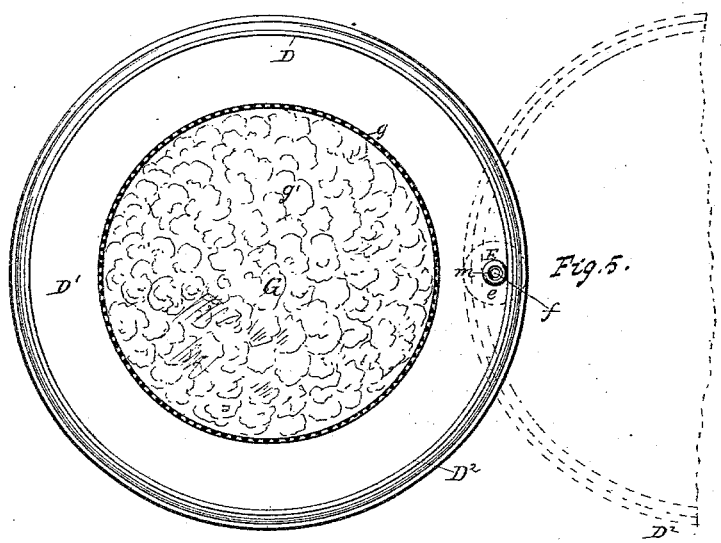
Figure 4:
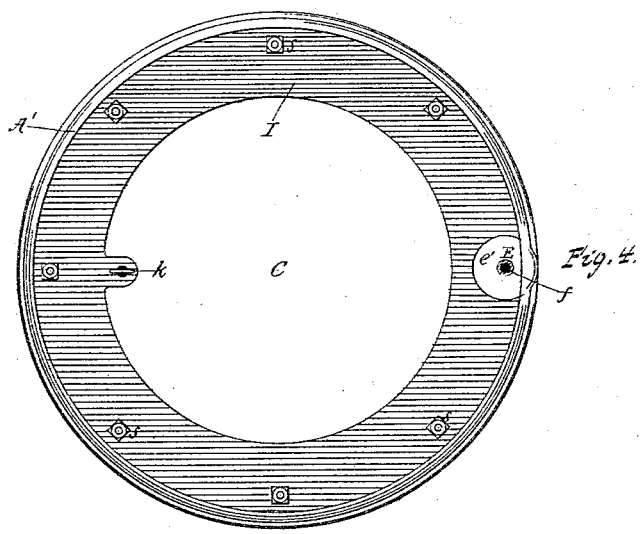

Figure 1 is a sectional elevation of a water-filter containing my improvements. Fig. 2 is a horizontal sectional view taken at line 1 in Fig. 1. Fig. 3 is a horizontal sectional view taken at line 2 in Fig. 1. Fig. 4 is a plan view of the upper end of the case of the filter proper, as at line 3 in Fig. 1. Fig. 5 is a sectional view of the chamber at the bottom of the impure-water vessel, taken at line 4 in Fig. 1. Fig. 6 is a sectional elevation of a water-filter, showing a modification of some of the parts of my invention. Fig. 7 is a sectional view taken at line 5 in Fig. 6. Fig. 8 is a sectional view taken at line 6 in Fig. 6. Fig. 9 is a sectional view taken at line 7 in Fig. 6; and Fig. 10 is a sectional view taken at line 8 in Fig. 6.

The same letters of reference refer to similar parts throughout the several views.

In the drawings, A is the outer shell or case of the filter, which contains the duplex filter medium employed by me, held in filtering-chambers B and B', and the pure-water chamber C.

D is a vessel containing the impure-water chamber D'. This vessel is supported on the upper end of case A, and is adapted to be turned in either direction horizontally, so as to open the upper end of said case or shell for communication with the pure-water chamber, or to close the same in a close manner. The bottom of this vessel D is seated in the flange-ring $D^2$, which rests on flange-ring A', secured to the upper edge, $a$, of case or shell A; and these flange-rings $D^2$ and A' are pivoted together by the vertical pivot E, from one of their sides, respectively, with broad bearing-surfaces $e$ and $e'$ coacting with the vertical pivot to securely hold the flange-ring $D^2$ and its seated vessel D in a horizontal position in all its situations, whether setting over the water-chamber C in case A, as shown by full lines in Figs. 1 and 6, or when moved to one side, as shown by dotted lines in Fig. 5. Pivot E is made with shoulder $m$, and is provided with a screw-nut, $n$, on its lower end and passing through the centers of bearings $e$ $e'$, made with the respective flange-rings A' and $D^2$. This pivot securely holds said flange-rings together and permits them to turn freely in relation to each other. This pivot is made with a central perforation, $f$, which communicates at its upper end with chamber D' in vessel D, and at its lower end with tube or pipe F, which is coupled to said perforated pivot by means of the screw-threaded nut $n$, and this pipe F communicates with the sub-filter chamber B, so that it will lead the water passing down through said perforated pivot from chamber D' into said filter-chamber.

G is a strainer arranged in the lower portion of chamber D', and is formed in part by the perforated wall $g$, which is shown in Figs. 1 and 5 to be circular, and occupying the central portion of said chamber, and in Figs. 6 and 10 to occupy a side portion of the said chamber. In another part this strainer is formed of sponge $g'$, inclosed with the perforated wall $g$, and between perforated cover $g^2$ and the bottom of vessel D. By the arrangement of this strainer as shown in Fig. 1, or in its modification, Fig. 6, all the water passing from chamber D' to the perforated pivot E must have passage through said strainer and be strained free from all the larger particles of foreign substances which may be in the water in said chamber before passage through tube F into filter-chamber B. Cover $D^3$ of vessel D is hinged to the latter by hinge $d$, for convenience of access to said vessel, and obviating the necessity of complete removal and placement in situation foreign to the vessel.

Chamber B, which I denominate the "sub filter-chamber," contains a stratum of gravel in its lower half or portion and a stratum of granulated charcoal in its upper half or portion; and chamber B', which I denominate the "super filter-chamber," contains strata $b'$ of coarse white sand, and strata $b^2$ of granulated bone-charcoal, and the upper strata, $b^3$, of powdered or finely-granulated quartz or equivalent clean and heavy mineral.

In Fig. 1 the sub filter-chamber B is shown to be concentric to the super filter-chamber B'. This relative arrangement of said two filter-chambers is preferred when it is desirable to reduce the height of the whole apparatus, as when it is intended to be used on a counter. In this arrangement of the two filter-chambers a circular wall, $c$, concentric to the water-space $c'$, and having its upper portions perforated, as shown, retains the filtering medium or material, and the water from tube F passes upward from the bottom of chamber B and thence through perforations in wall $c$ into the annular water-space $c'$, and down to the shallow chamber $c^2$, and thence upward through the several strata of filtering material in super filter-chamber B'. In the relative arrangement of these chambers B and B' shown in Fig. 6 the chamber B is situated below chamber B', and the water from tube F, passing directly into chamber B, has direct passage upward into super chamber B'. This relative arrangement is preferred whenever the height of the apparatus will admit the chambers to be so situated without disadvantage as to access to the chamber C and D' above.

The super filter-chamber B' is contained in vessel $B^3$, which is readily removable at will with it contents. This vessel is made with a gradually downwardly-tapering form of solid side walls, and is provided with a perforated bottom, $b$, and is suspended from any suitable form of ring-flange H, secured in a firm and water-tight manner to the case or shell A, preference being given to the two forms of ring-flanges H in Figs. 1 and 6. The joint between this vessel $B^3$ and ring-flange H is made water-tight by means of gasket $h$, so that no water can escape upward into chamber C without passing through the two filtering-chambers B and B'.

C', Figs. 1 and 3, is an annular dead-chamber between shell A and the wall of pure-water chamber C, and is intended to prevent the outer atmosphere affecting the temperature of the water in chamber C. The upper end of this dead-chamber is closed by the ring-plate I, which is secured on the upper side of the horizontal portion of flange-ring A' by bolts or screws $s$. This ring-plate also operates to hold down the vessel containing water-chamber C. In some cases, as in cheaper constructions, I omit this dead-chamber and ring-plate I, as shown in Fig. 6.

N is a water-cooler of any known form of construction, supported in a suitable manner adjoining shell A, and connected with the latter by faucet O, which communicates with chamber C of the filter and water chamber N' of the water-cooler. Faucet O is provided with key $k$, and has its stem preferably extended upward above the upper end of chamber C, and provided with a handle for convenience of operating the faucet for letting in or cutting off at will a flow of water (pure) from chamber C to the water-chamber of the cooler.

P is a draft-faucet connected with the pure-water vessel at near the bottom of chamber C for drawing the purified water therefrom.

Q is a faucet, made secure with the lower end of shell A and communicating with sub filtering-chamber B, as shown in Figs. 2, 6, and 7. Through this faucet the water in chamber B can be drawn at will and will be discharged, when the flow of the water will be reversed so as to run down and out from chamber C and through the two filtering-chambers B B' when it is desired to wash out from the filtering mediums the foreign substances which may have accumulated therein.

The manner of operation of my above-described filter is as follows: Ordinary water is introduced into vessel D until it has been filled. This water will pass through strainer G to perforated pivot E, and thence down and through pipe F into sub filtering-chamber B, and thence upward through the filtering medium therein, and then through the filtering material in super filtering-chamber B', and be discharged upward into chamber C for passage into cooler N, and draft from faucet P. When the water is filling into chamber C from its bottom or chamber B', the air in said chamber C will gradually escape at the joint between flange-rings A' and $D^2$. I prefer each day to remove sponge $g'$ of strainer G, and wash the same clear from all the foreign substances and matters which might have accumulated therein. When it is desired to cleanse the filtering mediums in chambers B and B' from the foreign matters accumulated therein, I fill chamber C with water and open faucet Q, when the volume of water in said chamber will flow down and be forced through the filtering-mediums in both filtering-chambers in direction downward in each and wash out the foreign matters. Two or more of these washings will suffice if they are made about once each week.

Having described my invention, what I claim, and desire to secure by Letters Patent, is—

1. In water-filters, the combination, with the vessel containing in its lower portion a filtering chamber or chambers, and a pure-water chamber above and communicating with said filtering chamber or chambers, of the impure-water vessel D, supported on the upper end of said vessel, and the perforated pivot E and tube F, connecting the said impure-water vessel with said filtering chamber or chambers, substantially as and for the purposes set forth.

2. In water-filters, the combination, with shell A, containing in its upper portion the pure-water chamber, and the internal flange-ring H, secured to said shell at the bottom of said pure-water chamber, of the removable vessel containing filtering material, pipe F, perforated pivot E, and the water-vessel D, adapted to be turned in either direction on said pivot, substantially as and for the purposes set forth.

BENJ. L. HOOD.

Witnesses:
ALEX. SELKIRK,
HARLES SELKIRK.